United States Patent [19]

Eng

[11] 4,263,786
[45] Apr. 28, 1981

[54] FUEL CONSERVING AIR-CONDITIONING APPARATUS AND METHOD FOR AIRCRAFT

[75] Inventor: Kaiwah G. Eng, Seattle, Wash.

[73] Assignee: The Boeing Company, Seattle, Wash.

[21] Appl. No.: 56,241

[22] Filed: Jul. 10, 1979

[51] Int. Cl.³ .............................................. F25B 17/06
[52] U.S. Cl. ........................................ 62/87; 62/89; 62/172; 62/402; 62/430
[58] Field of Search ...................... 62/87, 89, 172, 201, 62/402, 430

[56] References Cited

U.S. PATENT DOCUMENTS

| | | | |
|---|---|---|---|
| 2,485,522 | 10/1949 | Anderson | 62/402 |
| 2,491,461 | 12/1949 | Wood | 62/172 |
| 2,491,462 | 12/1949 | Wood | 62/172 |
| 2,562,918 | 8/1951 | Hynes | 62/172 |
| 2,618,470 | 11/1952 | Brown et al. | 62/402 |
| 2,693,088 | 11/1954 | Green | 62/172 |
| 2,734,443 | 2/1956 | Wood | 62/172 |
| 2,851,254 | 9/1958 | Messinger et al. | 62/172 |
| 2,856,758 | 10/1958 | Eggleston et al. | 62/172 |
| 2,902,836 | 9/1959 | Le May et al. | 62/172 |
| 2,940,258 | 6/1960 | Lombard et al. | 62/402 |
| 3,024,624 | 3/1962 | Morley et al. | 62/402 |
| 3,045,983 | 7/1962 | Best | 62/172 |
| 3,177,679 | 4/1965 | Quick et al. | 62/172 |
| 3,699,777 | 10/1972 | Rannenberg | 62/172 |
| 3,877,246 | 4/1975 | Schutze | 62/402 |
| 3,878,692 | 4/1975 | Steves | 62/172 |
| 4,018,060 | 4/1977 | Kinsell et al. | 62/172 |
| 4,021,215 | 5/1977 | Rosenbush et al. | 62/402 |

Primary Examiner—Ronald C. Capossela
Attorney, Agent, or Firm—Christensen, O'Connor, Johnson & Kindness

[57] ABSTRACT

An aircraft cabin air-conditioning system, of the type that uses engine bleed air, regulates the amount of tapped bleed air so as to be just sufficient to maintain a desired cabin pressure, thus minimizing the fuel burn allocated to the aircraft's environmental control system. The air-conditioning system cools the bleed air by passing it first through a heat exchanger 50 of a circulating glycol/water coolant loop 55 for heat transfer to a coolant and then through an evaporator 60 of an electrically-driven vapor-cycle loop 56 for supplemental heat transfer to a refrigerant. The rate at which the refrigerant is circulated through the evaporator 60 is regulated to be just sufficient to provide a required supplemental cooling capacity, thereby minimizing electrical power consumed by a compressor 63 that forms part of the vapor-cycle loop 56. A subbranch of the coolant loop 55 carries the coolant through a condenser 64 of the vapor-cycle loop 56 where there is an additional transfer of heat to the coolant. Bulk fuel in the aircraft fuel tanks as well as heat loss from the wing's lower and upper skin surfaces during flight are used as a heat sink for heat that has been transferred from the bleed air to the coolant, and for this purpose the coolant loop 55 circulates the fluid coolant through a fuel-cooled heat exchanger 59. To further conserve the volume of air that must be bled from the engine, used cabin air is filtered and recirculated through the evaporator 60 of the vapor-cycle loop 56 where it is recooled prior to being reintroduced into the cabin.

22 Claims, 2 Drawing Figures

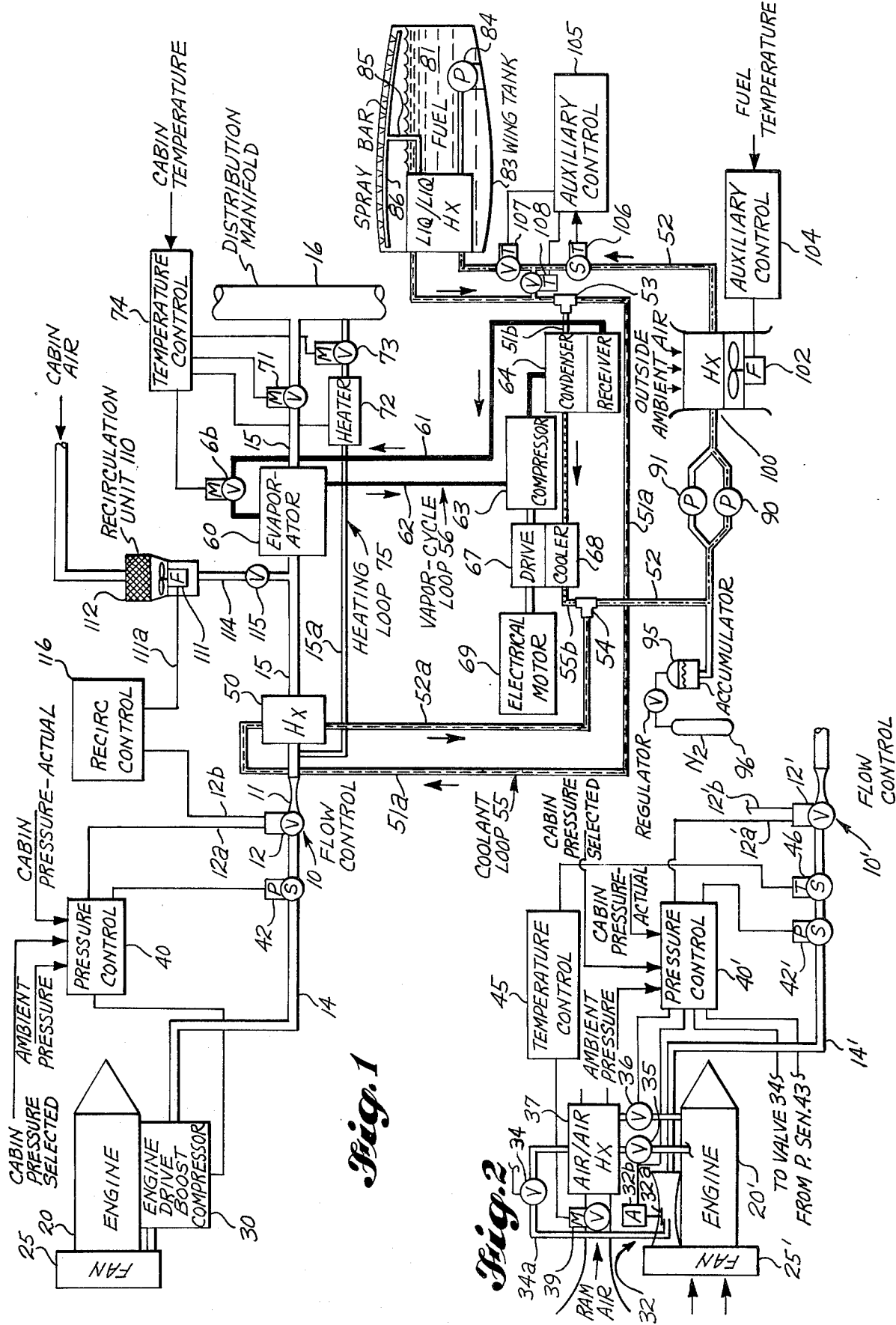

FUEL CONSERVING AIR-CONDITIONING APPARATUS AND METHOD FOR AIRCRAFT

BACKGROUND OF THE INVENTION

The present invention relates to air-conditioning systems for aircraft, and more particularly to such systems which include electrically-powered vapor-cycle cooling and use bulk fuel as a heat sink.

In the early 1960s, when it was determined that engine bleed air could be safely used in aircraft air-conditioning systems, commercial aircraft manufacturers switched from electrically-driven vapor-cycle systems to simpler, lighter weight, less expensive air cycle systems for providing pressurized, conditioned air to the aircraft cabin. Air cycle systems were considered more reliable and easier to maintain than vapor-cycle systems and the amount of fuel burn allocated to supply the high-pressure air characteristically required by the compressors and expansion turbines of the air cycle systems was not a controlling design factor.

Various improvements in the efficiency and design of early air cycle systems have been introduced. Presently, the most common type of air-conditioning system used in the commercial aviation industry is the so-called three-wheel bootstrap system. In a typical version of that system, a compressor receives regulated high-pressure and precooled bleed air from an aircraft engine(s) and delivers it via a heat exchanger to an expansion turbine. Exhaust air from the turbine, which has been cooled in the heat exchanger and further cooled by virtue of performing work in driving the turbine, is fed as conditioned air into the cabin. The expansion turbine drives the compressor (thus the term bootstrap) and also drives a fan which functions to draw ram (ambient) air through the heat exchanger.

Aircraft manufacturers have incorporated various design modifications in order to improve the efficiency of the basic three-wheel air cycle bootstrap system, such as recirculating cabin air through the system to reduce the volume of engine bleed air required. Nevertheless, the three-wheel air cycle bootstrap system remains a pressure-driven air cycle cooling system requiring engine bleed air at a pressure substantially above cabin pressure to drive a compressor and an expansion turbine. Under all flight conditions, this high-pressure bleed air can only be obtained from the compressor stages of the aircraft engines, which involves a significant fuel burn penalty. And, since high-pressure bleed air so obtained is at a commensurately high temperature, precooling is accomplished at the engine to reduce fire hazards. Additionally a substantial amount of ram air (for cooling) is required to be drawn through the bootstrap system's heat exhanger(s). These requirements result in increased drag and a further fuel burn penalty.

In the air-conditioning systems adapted for certain military aircraft, the requirement for ram air has been reduced by replacing ram air heat exchangers with heat exchangers cooled by fuel from the fuel tanks of the aircraft. Even so, these air-conditioning systems remain basically air cycle systems driven by high-pressure engine bleed air and as such, have the above-mentioned shortcomings.

Therefore, it is a general object of the present invention to provide an aircraft air-conditioning system which minimizes the requirement for engine bleed air, and thereby reduces the amount of fuel burn allocated to the air-conditioning system.

More specifically, it is a feature of the present invention to provide an aircraft air-conditioning system which taps just enough engine bleed air so as to maintain cabin pressure, and which cools the tapped bleed air with a combination of an electrically-driven vapor-cycle cooling subsystem and fuel as a heat sink.

A further feature of the invention is to provide such an aircraft air-conditioning system incorporating a vapor-cycle cooling subsystem in which the condenser for the vapor-cycle subsystem is cooled by a liquid coolant that in turn uses the fuel in the aircraft fuel tanks as a heat sink for dissipating heat accumulated by the vapor-cycle condenser.

As an additional fuel efficiency consideration, it should be noted that an air cycle system requires a fuel-burning auxiliary power unit (APU) to provide the high-pressure air needed to operate the air-conditioning system when the aircraft is on the ground and the engines are shut down. In addition to their fuel burn requirements, APUs represent added weight and present additional maintenance requirements.

Therefore, another object of the present invention is to provide an aircraft air-conditioning system which eliminates the need for an auxiliary power unit to supply high-pressure air for the cooling cycle.

SUMMARY OF THE INVENTION

Briefly, to achieve these and other objectives, features and advantages that will be apparent from the following detailed description, the aircraft air-conditioning system of the present invention provides for regulating the amount of tapped engine bleed air so as to be just sufficient to maintain a preselected cabin pressure and cooling the tapped bleed air by transferring heat therein to a coolant loop and an electrically-driven vapor-cycle refrigeration loop. The vapor-cycle loop circulates a refrigerant through an evaporator, an electrically-driven compressor and a condenser. The evaporator extracts heat from the bleed air and in doing so changes the refrigerant to a vapor state. The vapor-cycle compressor passes the vapor state refrigerant into the condenser and into an associated heat exchange relationship with a fluid circulating in a coolant loop, separate from the vapor-cycle loop. Heat transferred to the coolant by the condenser allows the refrigerant to be converted to a liquid state, and the liquid of the coolant loop is in turn circulated through a liquid-to-liquid heat exchanger mounted in the aircraft fuel tanks for dissipating the condeser-absorbed heat into the aircraft's fuel. Preferably, heat that is thus absorbed into the fuel, is thereafter dissipated in the form of heat loss from air cooled wing skin surfaces that surround wing fuel tanks.

In a preferred embodiment, the engine bleed air is fed to a demand-type flow controller that supplies a sufficient volume of bleed air to the upstream side of a two-stage air cooling process, so as to maintain required cabin pressurization and air temperature control for the aircraft. One of the two stages of cooling is provided by the above-mentioned evaporator and associated vapor-cycle refrigeration loop. The other cooling stage is provided by a liquid-cooled heat exchanger adapted to pass the bleed air heat in exchange relationship with the fluid that is circulated in the coolant loop. The degree of cooling effected by the liquid-cooled heat exchanger varies as a function of the coolant temperature and thus depends on the heat sinking capacity of the fuel. The needed additional cooling of the bleed air to meet cabin temperature requirements is regulated by modulating the refrigerant circulation rate so as to effect just the required supplemental cooling, and no more, thereby minimizing the electrical power consumption of the vapor-cycle compressor.

BRIEF DESCRIPTION OF THE DRAWINGS

These and further features, objects and advantages of the invention will become apparent to those skilled in the art from the following detailed description and accompanying drawings of the currently preferred embodiments.

In the drawings:

FIG. 1 is a schematic diagram of the aircraft cabin air-conditioning system according to the present invention in which fan bleed air is supplied via an engine-driven boost compressor to a two-stage heat transfer system; and FIG. 2 is a schematic diagram of an alternative means for supplying pressurized bleed air to the heat transfer system in which fan bleed air is supplemented during certain operating conditions by intermediate-pressure and high-pressure engine bleed air.

DETAILED DESCRIPTION

Referring now to the aircraft air-conditioning system illustrated in FIG. 1, bleed air from an engine 20 is supplied via a supply conduit 14 to the upstream side of a flow control apparatus 10 which comprises a venturi restriction 11 in combination with a control butterfly valve 12. Butterfly valve 12 is pneumatically actuated in response to the pressure differential, or head, across the venturi to conduct a predetermined, substantially constant volumetric flow of bleed air to the downstream side of flow control 10. Additionally, valve 12 has an electrical sensor output 12a that produces a signal representing the instantaneous throttle setting of the pressure responsive valve element, and an electrically actuated input 12b that is effective to selectively bias the movement of the valve element so as to reset the rate of the constant volumetric flow.

Flow control 10 is calibrated to conduct bleed air through a heat exchanger 50 into an a/c conduit 15 at a rate commensurate with the requirements for cabin pressurization and ventilation. The bleed air tapped from engine 20 is supplied to the upstream side of flow control 10 at a pressure regulated to be equal to the total of the selected cabin pressure plus the estimated pressure drop across flow control 10 and across the cooling subsystems downstream of control 10. As an example, for a cabin pressure of 14.7 psi, a supply of bleed air at a pressure of about 16.7 psi applied to the upstream side of flow control 10 is adequate to provide sufficient controlled volumetric flow of ventilation air to the cabin and accommodate an estimated 2 psi drop between the upstream side of control 10 and the cabin.

To supply bleed air, at an adequate pressure to the upstream side of flow control 10, air is tapped from a fan stage 25, and boosted as necessary by an engine-driven boost compressor 30. From a fuel burn standpoint, it is preferable to tap the bleed air at a relatively low temperature and pressure from the fan portion of engine 20, rather than bleeding higher temperature and higher pressure air from the latter compressor stages. In addition, the higher temperature of compressor bleed air may overtax the cooling capacity of the heat transfer subsystems that are located downstream of flow control 10. The pressure of fan bleed air, however, depends upon the altitude and operating condition of the engine. For the usual full spectrum of anticipated flight conditions, bleed air cannot always be obtained from the engine fan at a pressure adequate to maintain the required pressure at the upstream side of flow control 10. As an example, during a typical flight of a commercial aircraft using high by-pass ratio jet engines, unboosted fan bleed air can be expected to be at an adequate pressure for cabin pressurization and ventilation only during take-off and then only up to around 3700 m. (12,000 ft.). When climbing above this altitude, while cruising, and especially when descending, the pressure of the fan bleed air is inadequate. For these latter flight conditions, the embodiment of the invention shown in FIG. 1 incorporates the engine-driven boost compressor 30 to provide a necessary boost to the fan bleed air pressure upstream of flow control 10.

Boost compressor 30 is driven directly off a shaft of the engine and is selectively operated in response to a pneumatic control signal received from a pressure control 40 whenever the fan bleed air pressure at the upstream side of flow control 10 falls below the required level. Control 40 is a conventional electropneumatic regulator that derives the boost control signal from a pressure sensor 42, situated in supply conduit 14 at the upstream side of flow control 10, from the throttle setting of butterfly valve 12, and from pressure sensor signals which represent desired or selected cabin pressure, actual cabin pressure and ambient pressure. From these latter pressure signals an actual differential pressure signal $P_a$ (ambient—actual cabin pressure) is derived by control 40, using conventional control circuitry, and compared with a selected differential pressure signal $P_s$ (ambient—selected cabin pressure) to produce an error signal plus approximately 2 psl for conduit loss that is effective to regulate the the pressure at sensor 42 so as to reduce the error to zero by operating compressor 30 as needed. Electrical sensor output 12a reflects an instantaneous throttle setting of an internal pressure responsive valve element in control 10 and, applies a signal to control 40 that biases the normal response of control 40 by inhibiting the start of, or pre-starting compressor 30 during certain transitory operating conditions of the system (such as during engine start-up) so as to provide a smooth transition of upstream pressure at flow control 10 as such pressure seeks the proper level.

The predetermined volumetric flow of pressure-regulated fan bleed air is delivered by flow control 10 into a/c conduit 15 for cooling in a two-stage heat transfer process. Conduit 15 first ducts the bleed air through a heat exchanger 50 which is adapted to pass it in heat exchange relationship with a coolant composed of glycol and water. The glycol/water (g/w) coolant is delivered to heat exchanger 50 via a line 51a of a g/w coolant loop 55 (indicated by the solid-dotted-solid lines in FIG. 1).

Bleed air exiting heat exchanger 50 is ducted to an evaporator 60 of a vapor-cycle loop 56 (indicated by the solid, heavy line in FIG. 1) for supplemental heat transfer, as required, to a suitable refrigerant such as freon. The vapor-cycle loop 56 preferably comprises a conventional vapor-cycle subsystem including, in addition to evaporator 60, a modulated expansion valve 66, an electrically-driven compressor 63, a condenser 64 and a receiver 65. The refrigerant is supplied, in a liquid state, from receiver 65 via a line 61 to the modulated expansion valve 66, which is actuated in response to circulation control signals from a cabin temperature control network 74 to control the circulation rate of the refrigerant in the vapor-cycle loop. The modulated expansion valve 66 is actuated to establish a refrigerant flow rate through evaporator 60 which is just adequate to provide the cooling capacity required to supplement the primary heat transfer stage (heat exchanger 50). After undergoing evaporative heat transfer, the vapor-state refrigerant is discharged by evaporator 60 through a line 62 into the compressor 63, which is driven by an electric motor 69 via a suitable drive linkage 67. The compressed refrigerant is discharged by compressor 63 into the condenser 64, with the thusly condensed refrigerant being returned to the receiver 65 to complete the vapor cycle.

After heat transfer in heat exchanger 50 and evaporator 60, the conditioned bleed air is passed by a/c conduit 15 through a modulation valve 71 into cabin distribution manifold 16. In addition, bleed air taken from the downstream side of flow control 10 can be shunted past heat exchanger 50 and evaporator 60 and fed via a heating conduit 15a through an electric heater 72 and a modulation valve 73 into manifold 16. A cabin temperature control network 74 is responsive to a cabin temperature signal developed by temperature sensors (not shown) in the aircraft cabin to selectively actuate modulated expansion valve 66, modulation valves 71 and 73 and heater 72 so as to control the temperature in the aircraft cabin.

In particular, control network 74 includes conventional logic and control circuitry responsive to the cabin temperature signal to provide the following functions. If the temperature of precooled bleed air delivered from heat exchanger 50 to evaporator 60 of the vapor-cycle loop 56 is such that further cooling is necessary, temperature control network 74 operates in a first thermostat-like mode to provide the required amount of additional cooling by controlling the operation of the vapor-cycle cooling loop. In this mode, i.e., where the bleed air from heat exchanger 50 must be further cooled to maintain the desired cabin temperature, control network 74 maintains modulation valves 71 and 73 in, respectively, the full open and full closed positions, and turns heater 72 off, and thermostatically modulates expansion valve 66 to provide the required amount of additional cooling capacity. Modulation of valve 66 thereby regulates the flow of refrigerant fluid through evaporator 60 varying the amount of cooling imparted to the bleed air. Assume now that the temperature in the aircraft cabin begins to drop. Temperature control network 74 responds by gradually closing modulated expansion valve 66, thereby reducing the flow of refrigerant fluid through the evaporator. If the cabin temperature continues to drop, upon reaching a predetermined temperature, modulated expansion valve 66 is moved to the full closed position, with the result that no additional cooling of the bleed air takes place in evaporator 60. This allows compressor 63 to idle, thereby minimizing the consumption of electrical power and in turn increasing the system's efficiency.

If the bleed air exiting heat exchanger 50 is still too cold, and cabin temperature continues to drop below the above-mentioned temperature, control network 74 responds by assuming a second mode and operates modulation valves 71 and 73 in tandem (heater 72 remains off). Valves 71 and 73 are modulated in a correlative fashion so that the required mix of precooled bleed air, via a/c conduit 15 and modulation valve 71, and uncooled (warm) bleed air, via heating conduit 15a and modulation valve 73, is delivered into cabin distribution manifold 16, establishing the desired cabin temperature, while maintaining a constant total volume of airflow to manifold 16. The above-described first and second modes of network 74 provide adequate temperature control for the entire range of anticipated flight conditions.

However, if the aircraft is on the ground on a cold day, and is receiving unheated air from a ground supply (not shown) connected to conduit 14, supplementary heating may be required. In this situation, temperature control network 74 functions in a third mode to dispose modulation valves 71 and 73 in respectively, the full closed and full open positions (the modulated expansion valve 66 remains in the closed position) and to turn on heater 72. Thus, air is delivered to cabin distribution manifold 16 via heating conduit 15a through heater 72, which is thermostatically cycled on and off by temperature control network 74 to provide the required degree of heating necessary to maintain the desired cabin temperature.

As noted above, the air-conditioning system uses the aircraft's fuel as a heat sink for dissipating heat extracted from the bleed air in the two-stage heat transfer process (heat exchanger 50 and evaporator 60). The coolant loop 55 circulates the glycol/water coolant through two heat transfer paths, and thence through a heat exchanger 59 adapted to bring fuel from the aircraft fuel tanks into heat exchange relationship with the g/w coolant. Schematically, a wing fuel tank, indicated generally at 83, contains a quantity of fuel 81. A pump 84 supplies fuel-to-heat exchanger 59. After heat transfer, the fuel is discharged from heat exchanger 59 through a line 85 and returned to fuel tank 83 by means of a spray bar indicated at 86. Those skilled in the art will recognize that, due to the dihedral of an aircraft wing, fuel in a partially full wing tank tends to occupy that portion of the tank adjacent the fuselage, while the outboard portion of the wing tank is empty. Accordingly, in a preferred embodiment, spray bar 86 is located adjacent the outboard end of fuel tank 83 nearest the tip of the wing and directs the sprayed fuel onto unwetted interior walls of the wing tank. From there, the sprayed fuel flows inboard along the lower interior wall of the wing tank, undergoing heat transfer with the air-cooled wing to improve the capacity of the fuel to act as a heat sink.

After heat transfer to the fuel, the g/w coolant is discharged from heat exchanger 59 through a line 51 to a flow divider 53 having two outlet orifices relatively sized to allocate predetermined portions of coolant flow between the two heat tranfer paths of the coolant loop 55. Thus, a portion of the coolant in line 51 is directed by flow divider 53 into a line 51a which conveys the coolant to heat exchanger 50 for extracting heat from the bleed air. The other portion of the coolant is directed by flow divider 53 into a line 51b which conveys the g/w coolant through condenser 64 for extracting heat from the refrigerant of the vapor-cycle loop. After heat transfer, the coolant is ducted from heat exchanger 50 by a line 52a, and from condenser 64 by a line 52b, the latter of which passes the coolant through a cooler 68 for the compressor drive linkage 67. Thereafter, lines 52a and 52b merge at a flow combiner 54 into a single return line 52.

Return line 52 conducts the coolant through a pump 90 and an auxiliary heat exchanger 100 back to the fuel-cooled heat exchanger 59. Pump 90 functions to circulate the coolant in the g/w loop at a predetermined flow rate. A backup pump 91, disposed in parallel with pump 90, is suitably controlled to assume the coolant pumping operation should pump 90 become disabled. An accumulator tank 95 in communication with return line 52 provides for the heat expansion of the coolant.

Because of the volatility of aircraft fuel, the heat sinking capacity of the fuel in fuel tank 83 is limited by a predetermined maximum allowable fuel temperature (such as 120° F.). As discussed above, bleed air is supplied through flow control 10 at substantially the temperature of bleed air from the fan portion of the aircraft engine which insures that, under almost all flight conditions, heat transfer from the bleed air in a/c conduit 15 to the g/w coolant and, thence, to the fuel in fuel tank 83, does not exceed the heat sinking capacity of the fuel. However, under certain conditions, such as long periods either in a holding pattern or on the ground on a hot day, the temperature of the fuel in tank 83 may rise to the maximum allowable level. To accommodate this situation, a fan 102 is suitably controlled, as by actuation signals from an auxiliary thermostat-type control network 104 responsive to fuel temperature, to draw outside ambient air through heat exchanger 100, thereby extracting heat from the coolant prior to its entering the fuel-cooled heat exchanger 59. At the other temperature extreme, an unusually low temperature of the returning coolant may eliminate the need for the heat sinking capability of the fuel in tank 83. In such case, a temperature sensor 106 causes another auxiliary thermostat-like control 105 to close a valve 107 and open a valve 108, thereby routing the coolant in return line 52 to flow divider 53 via line 51, bypassing the fuel-cooled heat exchanger 59.

It is an important safety consideration that fuel not be allowed to enter the coolant loop 55 via the fuel-cooled heat exchanger 59. Thus, should a leak develop in heat exchanger 59, it is essential that the pressure in the lines of the coolant loop 55 be maintained at such a level that coolant will leak into the fuel in wing tank 83, at least not until the leaking heat exchanger can be isolated. A pressure tank 96, containing pressurized nitrogen, is connected via a regulator valve 97 to the accumulator tank 95. Should a leak develop in the fuel-cooled heat exchanger 59 so that the coolant starts to leak into fuel tank 83, regulator valve 97 responds by releasing an adequate volume of pressurized nitrogen to cause the coolant leaked from the loop 55 to be replaced by coolant from the accumulator tank 95, thereby maintaining a positive pressure differential in the fuel-cooled heat exchanger 59 with respect to the fuel tank.

In order to reduce the volume of bleed air required for cabin pressurization and ventilation, and thereby reduce the fuel burn allocated to provide the bleed air, the air-conditioning system includes a recirculation unit 110 to recirculate used cabin air through the evaporator 60 of the vapor-cycle cooling loop 56. Recirculation unit 110 comprises a recirculation filter 112 and a constant volume recirculation fan 111 which can be turned on via a control line 111a, at the option of the flight crew, by means of a recirculation control unit 116, to draw a predetermined, constant volume of cabin air through a recirculation conduit 113 and recirculation filter 112. In the recirculation mode, a volumetric flow of recirculation air, typically equal to 50% of the volumetric flow in a/c conduit 15, is drawn through recirculation unit 110 and injected through a conduit 114 and a check valve 115 into a/c conduit 15 at a juncture intermediate heat exchanger 50 and evaporator 60. In this recirculation mode, the butterfly valve 12 of flow control 10 is biased in response to an electrical signal applied to input 12b produced by recirculation control unit 116, to correlatively reduce the rate of volumetric flow of bleed air through flow control 10 with respect to added volume flow of recirculated cabin air delivered to a/c supply conduit 15.

An alternate means for supplying pressure-regulated bleed air is shown schematically in FIG. 2. In this case, fan bleed air is ducted from fan 25' through a variable area ejector 32 into supply conduit 14'. In order to meet cabin pressurization and ventilation requirements during the flight conditions indicated above, the fan bleed air is supplemented with either intermediate-pressure (IP) or high-pressure (HP) bleed air from the compressor stages of engine 20'. In such case, an on/off valve 34 is opened to cause either IP bleed air, via a check valve 35, or HP bleed air, via a control on/off valve 36, to be ducted through a ram air heat exchanger 37, which passes the bleed air in heat exchange relationship with ram air from the ram air ducts of the aircraft. A conduit 34a then ducts the bleed air (either IP or HP) through valve 34 to the inlet of the variable area ejector 32 which includes a variable nozzle 32a and a controllable actuator 32b. Valves 34 and 36 are responsive to pneumatic control signals from a pressure control 40', described below, to selectively cause IP or HP bleed air to be tapped.

Control 40' is responsive to the amount of pressure augmentation required by the fan stage, and to the pressure of bleed air delivered to flow control 10', as sensed by pressure sensor 42'. When the fan pressure drops below a predetermined threshold, control 40' causes valve 34 to open to tap IP or HP bleed air. Thereafter, the amount of IP/HP bleed air used to supplement the fan air is regulated in response to the pressure sensed by sensor 42'.

While valves 34 and 36 and actuator 32b can be electrically driven, pneumatic control is preferred because it allows a faster response time and is more reliable under the extreme environmental conditions to which these valves are subjected.

In conjunction with pressure control 40', a temperature control 45 is regulating the ram air flow through heat exchanger 37 by means of modulation valve 39 operating in response to a temperature sensor 46 situated in conduit 14'. As more fully described herein, this regulated ram air flow precools IP and HP bleed air to a level within the heat absorbing capability of the air-conditioning system.

During operation of the alternative bleed air supply of FIG. 2, when pressure sensor 42' indicates that the pressure of fan bleed air exiting ejector 32 is inadequate, then pressure control 40' actuates modulation valve 34 so that IP bleed air is ducted through check valve 35 and heat exchanger 37 into the ejector 32, thereby increasing the pressure at the upstream side of flow control 10'. The amount of IP bleed air conducted through ejector 32 is regulated by pressure control 40', variable nozzle 32a and controllable actuator 32b to be just adequate to maintain a pressure at the upstream side of flow control 10' consistent with cabin pressurization and ventilation requirements. If, under certain flight conditions, the pressure of the IP bleed air becomes insufficient, pressure control 40' responds by opening valve 36. As a result, HP bleed air is conducted through heat exchanger 37 to ejector 32, with the IP bleed air being checked off by check valve 35. Thereafter, the amount of HP bleed air conducted through ejector 32 is regulated by modulation valve 34, variable nozzle 32a, controllable actuator 32b, and pressure control 40'. Typically, for a commercial aircraft, the pressure of the IP bleed air would be expected to be adequate for supplementing the fan bleed air during climbing above 3700 M. (12,000 ft.), cruising and descent below 3700 m., while HP bleed air would be required during the initial stage of descent.

In particular, pressure control 40' comprises a conventional electro-pneumatic unit, having electrical inputs and pneumatic outputs for controlling valves 34 and 36 and ejector actuator 32b in accordance with the operational modes described below. The electrical input signals include: sensor signals representing selected and actual cabin pressures and ambient pressure from which actual cabin differential pressure $P_a$, and selected cabin differential pressure $P_s$ signals are derived as described above with respect to pressure control 40 of FIG. 1. Additionally, control 40' is responsive to a pressure sensor signal from pressure sensor 42', and a throttle setting signal from output 12a' of butterfly valve 12' of flow control 10'. In response to these electrical inputs, control 40' functions to operate the associated valves and actuators so as to cause bleed air to be supplied to the upstream side of flow control 10' at a pressure regulated to be at a predetermined level (e.g., approximately 2 psi) above the selected cabin pressure.

When climbing to around 12,000 feet the pressure of fan bleed air, supplied to the upstream side of flow control 10 through the variable area ejector 32, is normally sufficient to provide the desired pressure. The output signal from sensor 42' reflects this operating condition and control 40' responsively maintains IP/HP bleed valve 34 closed, and modulates control nozzle 32a of the variable area ejector 32, by means of pneumatic actuator 32b that is responsive to a pneumatic or control error signal produced by control 40', so as to maintain the desired pressure upstream of flow control 10'. Since the temperature of fan bleed air is always within the heat cooling capacity of the air-conditioning system, no separate temperature control is needed in this mode.

When climbing above 12,000 feet, during cruising, and while descending, the pressure of fan stage air is no longer adequate to provide the desired bleed air pressure upstream of flow control 10'. The drop in the pressure of the fan stage, below a certain threshold level, is sensed by sensor 42'. Pressure control 40' responds by opening the modulating valve 34, allowing IP pressure bleed air to be tapped from engine 20 and supplied to the variable area ejector 32 via check valve 35, ram air heat exchanger 37 and conduit 34a. In this mode, control 40' responds to a signal from pressure sensor 42' and controls the proportion of IP bleed air mixed into the fan bleed air by controlling the position of nozzle 32a of the variable area ejector 32 by modulating actuator 32b. As fan pressure decreases, an increasing proportion of IP air is passed to conduit 14'.

During the initial stage of descent from cruise altitude, the IP bleed air cannot be expected to adequately supplement the fan bleed air. Thus, the pressure upstream of flow control 10' drops, and this change is sensed by pressure sensor 42', and pressure control 40' responds by opening on/off valve 36, allowing HP bleed air to be tapped from the higher pressure compressor stages of engine 20. The HP bleed air is supplied through heat exchanger 37 and conduit 34a to the variable area ejector 32, and the lower pressre IP bleed air is checked off by check valve 35. Thereafter, control 40', in response to pressure sensor 42', controls the pressure at the upstream side of flow control 10' by controlling the position of the nozzle 32a of the variable area ejector 32 by modulating actuator 32b so as to supplement fan bleed air with HP bleed air as necessary.

Pressure control 40' is also provided with an input from throttle output 12a' that provides a function similar to the above-described output 12a of control 10 in FIG. 1. Normally, a low reading from pressure sensor 42' would cause control 40' to increase the flow of tapped IP or HP bleed air from engine 20. However, during such transient startup conditions, the throttle setting of the control 10' is wide open. In such case, output 12a' produces a signal causing pressure control 40' to inhibit the operation of valve 34, maintaining it closed, and thus delaying the tapping of IP/HP air and allowing the fan bleed air pressure to build up at sensor 42'. In another transient condition, output 12a' produces a signal causing pressure control 40' to anticipate, by movement of the butterfly valve element toward a full open condition, that IP/HP air is going to be needed. In response thereto control 40' advances the opening of valve 34 to smooth out transient pressure fluctuations that would otherwise occur at flow control 10'.

Temperature control 45 is a conventional electropneumatic control having the following operational characteristics. In order to limit the temperature of the bleed air at the upstream side of flow control 10' to a maximum level that is within the heat absorbing capability of the air-conditioning system (e.g., approximately 200° F.), the ram air heat exchanger 37 is used to pass ram air in heat exchange relationship with the HP/IP bleed air from engine 20. Since the channeling of ram air through exchanger 37 increases the drag on the aircraft, for fuel efficiency purposes it is desirable to limit the amount of ram air drawn through heat exchanger 37 to only that which is necessary to maintain the desired temperature of the bleed air in supply conduit 14'. Accordingly, temperature control 45 receives a temperature sensor signal from sensor 46 situated at the upstream side of flow control 10' and, in response thereto, operates modulation valve 39 to draw sufficient ram air through ram heat exchanger 37 to cool the HP/IP bleed air in conduit 34a to within the desired temperature range.

The present invention has been described in relation to a preferred aircraft air-conditioning system for delivering pressurized, conditioned bleed air to the aircraft cabin. The air-conditioning system utilized bleed air, preferably from the fan portion of the aircraft engine, at a pressure just sufficient to maintain cabin pressure, thereby minimizing the fuel penalty associated with tapping engine bleed air for environmental control. Also, the relatively low pressure bleed air can be obtained at a commesnurately low temperature, thus reducing the requirement for ram air cooling. The bleed air is initially cooled by heat transfer to a circulating coolant, with supplemental heat transfer being provided as needed by an electrically-driven vapor-cycle loop. The refrigerant in the vapor-cycle loop is circulated at a rate controlled to provide just the cooling capacity that is required to adequately supplement the primary heat transfer to the coolant, thereby minimizing the electrical power consumption required to drive the vapor-cycle compressor. The fuel in the aircraft fuel tanks provides the heat sink for the air-conditioning system, with the coolant in the primary cooling loop being circulated through a fuel-cooled heat exchanger. In order to reduce the volume of bleed air required, used cabin air can be recirculated through the evaporator of the vapor-cycle loop for recooling. Also, since the present invention does not utilize air pressure-driven compressors and turbines, auxiliary power units are not needed to provide the otherwise required high-pressure air to the aircraft air-conditioning systems when the aircraft engines are shut down.

While the invention has been described with respect to a preferred embodiment, it is to be clearly understood by those of ordinary skill in the art that the invention is not limited thereto, and can be modified and equivalent elements substituted within the spirit of the invention as set forth in the appended claims.

The embodiments of the invention in which an exclusive property or privilege is claimed are defined as follows:

1. A fuel conserving air-conditioning apparatus for an aircraft cabin that operates effectively with a supply of air bled from a turbo-fan engine at minimal pressure and temperature, comprising:

flow control means for receiving engine bleed air and for passing a constant volumetric rate of flow of such bleed air;

a coolant loop including an air-to-coolant heat exchanger means for receiving bleed air passed by said flow control means and for transferring heat therefrom to a coolant so as to cause a partial cooling of the bleed air, heat sink means for receiving said coolant and extracting heat therefrom, and means for circulating said coolant through said heat exchanger means and said heat sink means;

a vapor-cycle loop including an evaporator means for receiving the partially cooled bleed air from said heat exchanger and for receiving and evaporating a liquid-state refrigerant to a vapor state in heat exchange relation with said bleed air so as to extract additional heat therefrom and cause further cooling of the bleed air, compressor means for compressing the vapor-state refrigerant, and condenser means for condensing the thusly compressed vapor-state refrigerant to a liquid state, and means for circulating said refrigerant through said evaporator means, compressor means and condenser means;

duct means for ducting bleed air from said evaporator means to an aircraft'scabin; and means for controlling the rate of circulation of said refrigerant in said vapor-cycle loop as a function of air temperature in an aircraft's cabin so as to regulate the degree of said further cooling of the bleed air.

2. The apparatus of claim 1 wherein said condenser means of said vapor-cycle loop comprises heat exchanging means connected to said coolant loop for receiving the circulated coolant and for transferring heat from said refrigerant whensaid refrigerant is in said condenser means to said coolant.

3. The apparatus of claim 2 wherein said coolat loop comprises first and second subloops, each conducting a portion of the total flow of said coolant, said first subloop of said coolant being connected to conduct said coolant through said air-to-coolant heat exchanger means, and said second subloop of said coolant loop being connected to conduct coolant through said heat exchanging means in said condenser means of said vapor-cycle loop.

4. The apparatus of claim 3 wherein said coolant loop comprises flow combiner means for combining the coolant flowing in said first and second subloops into a main coolant flow conduit, and flow divider means connected to said main flow conduit for dividing the flow of coolant therein into said first and second subloops, and said heat sink means comprises a liquid-to-liquid heat exchanger connected in series with said main flow conduit and disposed in an aircraft fuel tank in heat exchange relationship with the fuel carried therein.

5. The apparatus of claim 4 wherein said heat sink means further comprises fuel conduit means connected to receive fuel and circulate fuel through said liquid-to-liquid heat exchanger means mounted in said fuel tank, and pump means for pumping fuel within said tank through said fuel conduit means and hence through said liquid-to-liquid heat exchanger means.

6. The apparatus of claim 5 wherein said fuel tank is mounted in a wing of the aircraft, and further comprising a fuel discharge conduit connected at the discharge side of said liquid-to-liquid heat exchanger, and a spray bar means connected to said fuel discharge conduit, said spray bar means being located in said fuel tank for receiving fuel passed through said liquid-to-liquid heat exchanger and for directing said fuel at an interior wall of said tank so as to dissipate heat received by said fuel in said liquid-to-liquid heat exchanger means.

7. The apparatus of claim 5 further comprising means connected to said main flow conduit of said coolant loop for maintaining the pressure of said coolant flowing therein at a greater pressure than that of said fuel conducted through said liquid-to-liquid heat exchanger means, whereby a pressure differential between said coolant and said fuel in said liquid-to-liquid heat exchanger means prevent leakage of said fuel into said coolant loop.

8. The apparatus of claim 1 wherein said heat sink means of said coolant loop comprises means for exchanging heat between said coolant and fuel carried by the aircraft.

9. The apparatus of claim 8 further comprising an auxiliary heat sink means including a liquid-to-air heat exchanger means connected in said coolant loop for passing said coolant therethrough, and having means for ducting ambient air in heat exchange relationship with said coolant.

10. The apparatus of claim 9 wherein said auxiliary heat sink means comprises means for controlling the flow of ambient air through said liquid-to-air heat exchanger means, and temperature sensing means for sensing the temperature of said fuel, and control means responsive to said temperature sensing means for operating said ambient air flow control means as a function of the temperature of said fuel.

11. The apparatus of claim 1 wherein said means for controlling the rate of circulation of said refrigerant comprises modulation valve means connected in said vapor-cycle loop, said modulation valve means including a fully closed position for stopping the circulation of said refrigerant in said vapor-cycle loop when the air temperature in said cabin falls below a predetermined temperature.

12. The apparatus of claim 11 further comprising a heating conduit means having an inlet end connected between said flow control means and said air-to-coolant heat exchanger mans of said coolant loop and having a discharge end connected for delivering warm bleed air to an aircraft's cabin, and a first modulation valve connected to control the flow of bleed air from said heat exchanger means of said coolant loop and said evaporator means of said vapor-cycle loop to an aircraft's cabin, and a second modulation valve connected in series with said heating conduit, and cabin temperature control mans for correlative operation of said first and second modulation valves when said refrigerant modulation valve is in said off position, for delivering the proper mix of cool and warm bleed air to an aircraft's cabin for maintaining a selected temperature therewithin.

13. The apparatus of claim 1 wherein said flow control means comprises a fixed flow restricter and a pressure responsive, self-acting flow regulating valve, said flow regulating valve cooperating with said flow restricter for maintaining said constant volumetric rate of flow.

14. The apparatus of claim 13 further comprising pressure regulating means for regulating the pressure delivered to the upstream side of said flow control means as a function of cabin air pressure.

15. The apparatus of claim 1 whereinsaid aircraft enging is a fan-type turboject having a fan stage, and further comprising bleed air duct means for tapping bleed air from said fan stage and delivering said bleed air to the upstream side of said flow control means; and controllable means for selectively augmenting the pressure of said bleed air tapped from said fan stage as a function of the pressure of the bleed air received at the upstream side of said flow control means.

16. The apparatus of claim 15 wherein said means for augmenting the pressure of said fan bleed air comprises an engine-driven pressure boost compressor connected in series with said bleed air duct means between said fan stage and said flow control means.

17. The apparatus claim 15 wherein said fan-type turbojet engine comprises at least a first compressor stage, and wherein said means for augmenting the fan bleed air pressure comprises means for tapping bleed air fromsaid first compressor stage of said engine so as to provide compressor bleed air at a substantially higher pressure than said fan bleed air, and means for controllably injecting said compressor bleed air into said bleed air duct means so as to increase the combined bleed air pressure delivered by said duct means to the upstream side of said flow control means.

18. The apparatus of claim 17 wherein said first compressor stage of said engine supplies an intermediate bleed air pressure, and wherein said engine has a second compressor stage for supplying a high-pressure bleed air, and further comprising means for selectively introducing said intermediate-pressure bleed air from said first compressor stage into said bleed air duct, and means for selectively introducing said high-pressure bleed air from said second compressor stage into said bleed air duct.

19. The apparatus of either claim 17 or 18 further comprising heat exchanger means for cooling said engine compressor bleed air with ambient ram air.

20. The apparatus of claim 1 further comprising cabin air recirculation duct means for receiving stale cabin air and for reintroducing it into said evaporator means of said vapor-cycle loop along with said bleed air; air filtering means disposed in series with said air recirculation duct means for filtering the stale cabin air; and control means connected to said flow control means for correlatively reducing the rate of said bleed air through said flow control means as a function of the volumetric rate of flow of stale cabin air reintroduced into said evaporator means by said recirculation duct means.

21. A fuel conserving method for conditioning air bled at minimal pressure and temperature from an aircraft engine and for delivering the thusly conditioned air to a cabin within the aircraft, comprising the steps of:

controlling the flow of bleed air received from the engine to produce a constant volumetric rate of flow of such bleed air;

cooling said constant volumetric rate of flow of the bleed air in a first cooling stage by transferring heat from the bleed air to a coolant in an air-to-coolant heat exchanger and concurrently extracting heat from the coolant by circulating the coolant in heat exchange relationship with a heat sink;

further cooling the bleed air in a second cooling stage by transferring heat from the bleed air to an evaporating liquid-state refrigerant in a vapor-cycle loop;

ducting the bleed air that is further cooled in the second cooling stage to the cabin of the aircraft; and controlling the rate of circulation of the refrigerant in said vapor-cycle loop of said second cooling stage as a function of air temperature in the cabin.

22. The method of claim 21 further comprising the step of regulating the pressure of the engine bleed air as a function of cabin pressure, prior to the step of controlling the volumetric rate of flow of said bleed air.

* * * * *

UNITED STATES PATENT AND TRADEMARK OFFICE
CERTIFICATE OF CORRECTION

PATENT NO. : 4,263,786
DATED : April 28, 1981
INVENTOR(S) : Kai Wah G. Eng

It is certified that error appears in the above-identified patent and that said Letters Patent are hereby corrected as shown below:

| | |
|---|---|
| Face Sheet | First name of inventor should be two words "Kaiwah" should be --Kai Wah-- |
| Column 2, | Line 51: "condeser" should be --condenser-- |
| Column 10, | Line 4: "pressre" should be --pressure-- |
| | Line 60: "commesnurately" should be --commensurately-- |
| Column 11, | Line 51: "aircraft'scalien" should be --aircraft's calien-- |
| | Line 63: "coolat" should be coolant-- |
| Column 12, | Line 38: "prevent" should be --prevents-- |
| Column 13, | Line 1: "mans" should be --means-- |
| | Line 9: "mans" should be --means-- |
| | Line 24: "whereinsaid" should be --wherein said-- |
| | Line 25: "enging" should be --engine-- |
| | Line 42: "fromsaid" should be --from said-- |

Signed and Sealed this

Twenty-eighth Day of July 1981

[SEAL]

Attest:

GERALD J. MOSSINGHOFF

*Attesting Officer*   *Commissioner of Patents and Trademarks*